United States Patent [19]

Funaki et al.

[11] Patent Number: 4,726,649
[45] Date of Patent: Feb. 23, 1988

[54] OPTICAL FIBER CABLE

[75] Inventors: Kiyoshi Funaki; Kenichi Mochizuki, both of Yokohama; Yoshinori Suga, Tokyo; Eiji Tanaka, Kawasaki, all of Japan

[73] Assignees: Ocean Cable Co., Ltd.; Mitsubishi Chemical Industries Limited, both of Tokyo, Japan

[21] Appl. No.: 810,256

[22] Filed: Dec. 18, 1985

[30] Foreign Application Priority Data

Aug. 19, 1985 [JP] Japan ................ 60-180495

[51] Int. Cl.⁴ .............................. G02B 6/44
[52] U.S. Cl. .................. 350/96.23; 350/96.34
[58] Field of Search .............. 350/96.23, 96.34

[56] References Cited

FOREIGN PATENT DOCUMENTS

2143051 1/1985 United Kingdom .

Primary Examiner—William L. Sikes
Assistant Examiner—Robert E. Wise
Attorney, Agent, or Firm—Oblon, Fisher, Spivak, McClelland & Maier

[57] ABSTRACT

Disclosed herein is an optical fiber cable produced by pumping a two-liquid mixing and curing-type polyurethane resin which has the specified values in a tensile break strength, a breaking extension, a creep characteristics and the compression modulus of elasticity, in voids surrounding the optical fibers and those surrounding tension members of the cable.

7 Claims, 7 Drawing Figures

OPTICAL FIBER CABLE

BACKGROUND OF THE INVENTION

The present invention relates to an optical fiber cable, and particularly to a submersible optical fiber cable which is able to effectively prevent water-ingress in the case where the cable is damaged while submerged in water.

Of the attached drawings.

FIGS. 2(a), (b), (c) and (d) are illustrations which explain the mechanism of water-ingress;

FIGS. 4(a) and (b) are illustrations of the device for measuring creep characteristics and the graph therefor;

Figure 1:
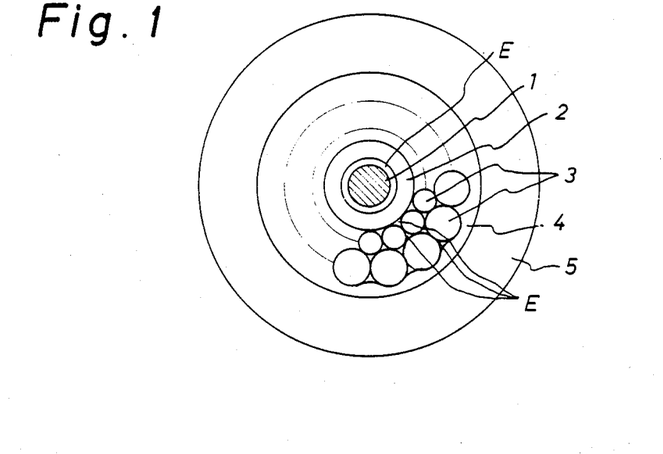
FIG. 1 is the cross-sectional view of a submersible optical fiber cable.

In FIG. 1 an optical fiber unit 1 of a diameter of 2.25 mm comprises a plurality of optical fiber cores wound around a central tension member and integrated with a filler, the optical fiber unit 1 is protected by the metallic (aluminum etc.) pressure-resistant layer 2 of an outer diameter of 5.2 mm, tension members 3 are placed on the outer surface of the metallic pressure-resistant layer 2 which has been made by using, for instance, 16 steel wires of 1.240 mm in diameter in the first layer thereof and 16 steel wires of 1.755 mm in diameter in the second layer thereof, the tension members 3 are restrained by a copper tube 4 and a insulating layer 5 comprising polyethylene, etc. is disposed around the copper tube 4.

Although the submersible optical fiber cable of the above-mentioned structure is designed so as to show a sufficient pressure-resistance even on the sea bottom at depths of several thousand meters, in the case of damage to the cable, voids E between the optical fiber unit 1 and the metallic pressure-resistant layer 2, and the metallic pressure-resistant layer 2 and the tension members 3 as well as among the tension members 3 allow the ingress of sea water, under a high hydraulic pressure into the cable as a result of ingress of water, a damage is caused in the long section of the cable, and the cable loses its transmitting capability.

Accordingly, a compound (material) has been pumped into the voids E of the cable when in the time of producing the cable is made to prevent damage due to water-ingress.

In the past, in the production of electric cables and optical cables, a hydrophobic, vaseline-like material has been used as an example of a water-blocking material for cables used on land (refer to Offenlegungsschrift No. 23 02 662 which corresponds to U.S. Pat. No. 4,072,398 and Offenlegungsschrift No. 24 29 670 which corresponds to British Pat. No. 1,445,732).

However, it is impossible to expect a sufficient water-blocking capability by the non-elastic material when the cable is used on the sea bottom as in the present invention.

In the production of the submersible cable, it is believed that a thermosetting liquid resin would have a high water-blocking property and would fill the voids in the complicated structure of the submersible cable without any voids remaining.

As the thermosetting-type liquid resin, silicone resins, epoxy resins and polyurethane resins may be mentioned.

In the case of using the epoxy resins or of silicone resins as the material for that purpose, the following defects are noticed.

(1) Since the epoxy resins become hard after curing, the bending property of the cable deteriorates. In addition, when the cable is bent by drum-winding, cracks are apt to develop in the thus filled resin. Besides, due to the large shrinkage of the resin during curing, an unnecessary pressure is applied onto the optical fibers resulting in an increase of transmission loss.

(2) As condensation reaction of the silicone resins, de-alcoholization, de-hydrogenation and de-hydroxyamination are mentioned, and all of the condensation reactions are unfavorable, because every condensation reaction causes metal corrosion.

In addition, in the two-liquid type addition reaction, (a) because of lack of the tackiness in the silicone resin itself, the adhesion of the resin to the metal is small and accordingly, in the case of filling the silicone resin in the voids within the submersible optical fiber cable, the phenomenon of sliding of the optical fiber unit 1 corresponding to the elongation and contraction of the cable within the metal (aluminum etc.) pressure-resistant layer occurs. (b) Since the UV resin (a resin cured by exposure to UV light) contains a catalyst poison to platinum catalyst which is a catalyst of the two-liquid silicone resin, the silicone resin is poisonized thereby and is not cured. (c) Since the silicone resin of this type is cured while containing a large amount of non-reacted Si-H bonding, there is a tendency of generating a larger amount of hydrogen as compared with other material such as nylon and polyurethanes under predetermined conditions (for instance, heating or adding moisture), and the thus generated hydrogen diffuses within the closed submersible optical fiber marine cable and penetrates into the optical fiber unit, thereby adversely affecting the transmitting property of the optical fibers.

As the known technique of using a polyurethane resin, a material containing polyester-polyether-polyol as the major component may be mentioned (refer to Offenlegungsschrift 28 47 383). However, the resin used in the Offenlegungsschrift has a high notch-sensitivity, and as a result of handling at the time of connecting the cables, the resin used in the Offenlegungsschrift is easily broken into a powder. Such a resin of a high notch-sensitivity is excellent in processing. On the other hand, cracks easily develop therewithin when the cable is bent, and accordingly, it is not expected that the resin will prevent the ingress of water.

In addition, as the other known technique of using polyurethane resin, there is a process of using a low-viscosity polyurethane resin (refer to U.S. Pat. No. 3,733,426). In this process disclosed in U.S. Pat. No. 3,733,426, for removing the water which has permeated into a telephone cable which is used on land and for preventing re-permeation of water, a higher effect of preventing of water-ingress is not required to this cable, and in addition, the viscosity of the polyurethane resin used in U.S. Pat. No. 3,733,426 is set forth at a low level of 100 cps in order to inject into the cable practical in use.

Even by the use of the above-mentioned material comprising the low-viscosity polyurethane resin, it is difficult to uniformly fill the material into the cable, and a high extent of prevention against water-ingress cannot be attained.

In consideration of the above-mentioned situation, the object of the present invention is to provide a highly reliable, submersible optical fiber cable by filling the voids of the cable with a certain two-liquid mixing-type polyurethane material.

The material as the object of the present invention is excellent in durability over the long term and does not harm the mechanical- and optical properties of the optical fibers, and exerts a sufficient effect of preventing the ingress of water.

In the present invention, a two-liquid curing-type polyurethane which is soft is provided. It has a specified structure. In addition, the filler is pumped into the voids of the cable, and by carrying out the hydraulic test thereon, the respective physical properties by which a sufficient effect of preventing the ingress of water is expected.

The ingress of water into a submersible cable is believed to occur by one or more of three factors.
(1) Failure of the filler to fill the voids.
(2) Adhesion failure between the filler and the interface of each element of the cable.
(3) Formation of a water-running passage upon the destruction of the filler.

Of the above-mentioned three factors, item 1 is a problem to be solved by the improvement of the performance of the equipment for production of the submersible optical fiber cable, and item 2 is a problem which can be solved by, for instance, roughening the surface of the metal pressure-resistant layer and the surface of the tension member in addition to improving the adhesive strength of the filler itself.

Accordingly, in the case where the material has been sufficiently filled into the voids and the interface condition is favorable, the mechanism of water-ingress is considered to be as follows.

Figure 2:
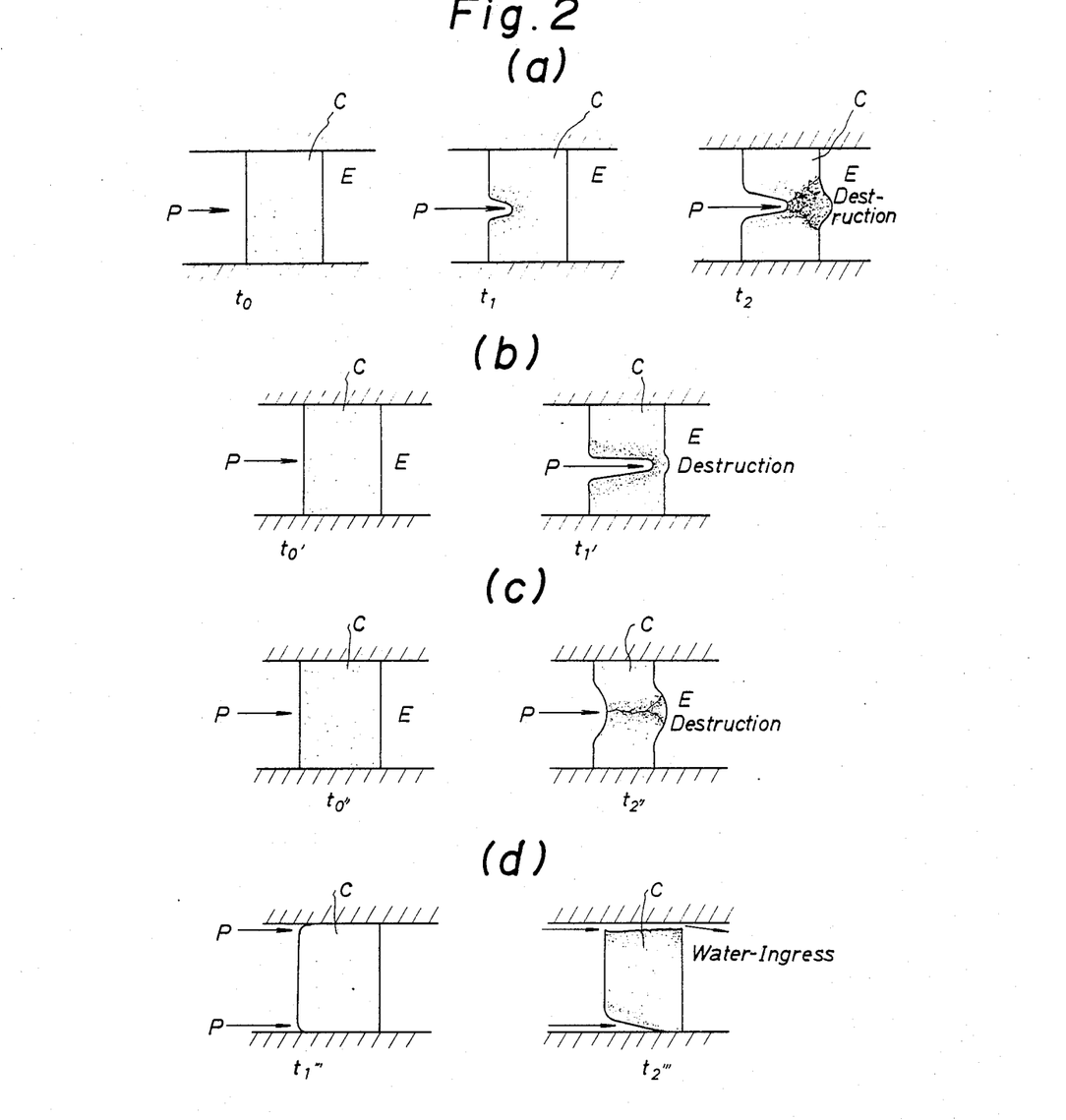

As are shown in FIG. 2(a), it is presumed that in the case where a hydraulic pressure (P) is loaded onto the material C which fills voids E, the material C is slowly deformed as shown by the times $t_0$, $t_1$ and $t_2$ corresponding to the creep characteristics of the material C and finally, it is destroyed. Water-ingress is considered to proceed while repeating the phenomenon of loading of hydraulic pressure onto, creep-deformation of and destruction of the material C which fills the voids.

Consequently, the material which is large in elongation and also in creep-deformation has a small persistence until it is destroyed as is shown in FIG. 2(b), and water-ingress occurs after a short time $t_1'$, upon destruction of the material C.

On the other hand, the material which has a small in elongation and also a small creep-deformation is destroyed as is shown in FIG. 2(c) after only a little deformation, within a short time $t_2''$.

Further, the material which is too hard in itself, i.e., it shows an extremely high compression modulus of elasticity and an extremely small creep-deformation, has a low hydraulic absorbing pressure effect (or the self-sealing effect is extremely small). Accordingly, the tendency of loading the hydraulic pressure P on the interface becomes conspicuous as is shown in FIG. 2(d), thereby causing the water-ingress within a short time of $t_2'''$ from the interface.

From the above, the effect of absorbing the hydraulic pressure and a large persistence are expected by selecting the material C having an adequate elongation property and creep characteristics.

Namely, it is appropriate to consider that the water-running rate within the material is determined by the mutual relationship among the creep characteristics as a result of the consideration of the time of the deformation, the compression modulus of elasticity, etc. in addition to the strength, the adhesive strength and elongation of the material itself.

SUMMARY OF THE INVENTION

In an aspect of the present invention, a submersible optical fiber cable is provided by filling a two-liquid mixing and curing-type polyurethane resin having a tensile break strength of higher than 0.50 kg/cm$^2$, a breaking extension of larger than 250%, a creep characteristics ($\epsilon_t/\epsilon_0$) obtained by calculation in the stress-relaxation test of less than 2.8 within 60 sec of determination time and the compression modulus of elasticity of less than 80 kg/cm$^2$, in the voids surrounding the optical fibers and the voids surrounding the tension members of the cable.

DETAILED DESCRIPTION OF THE INVENTION

The submersible optical fiber cable according to the present invention is produced by filling a specifically selected material into the voids within the submersible optical fiber cable, the specific selection being carried out, while considering the mechanism of water-ingress, the tensile breaking strength and the breaking extension and the adhesive strength of the material itself, as well as the creep characteristics of the material, for the purpose of using the material which is adequate to prevent water-ingress.

In order to attain these objectives, two-liquid mixing and curing-type polyurethane resins are used as filler material. The above-mentioned polyurethane resins are obtained by mixing a hydrocarbon polyol substantially not contains no unsaturated bonds and a polyisocyanate as the two major components, and then adding hydrocarbon oil to the thus prepared mixture. Namely, the polyurethane resin according to the present invention contains preferably not less than 10% by weight, preferably not less than 30% by weight of mixture comprising 50 to 99% by weight, preferably 70 to 96% by weight of the hydrocarbon polyol and 1 to 50% by weight, preferably 4 to 30% by weight of the polyisocyanate.

Also, 5 to 90% by weight, preferably 10 to 70% by weight of hydrocarbon oil is present in the polyurethane resin acccording to the present invention.

As the hydrocarbon polyol, namely, the polyhydroxy polymer a saturated hydrocarbon for use in producing the polyurethane resin, namely, the polymer composition (filler material) according to the present invention, a material which has a mean number of hydroxy groups (hereinafter referred to as the number of hydroxy groups) of more than 1.5 per molecule, preferably 1.8 to 8.0 and the number average molecular weight of 500 to 20,000 is used, the structure of the main chain of the polyol being a saturated hydrocarbon and the appearance of the polyol being liquid or brittle wax-like at ordinary temperature.

Various materials may be mentioned as the above-mentioned saturated hydrocarbon polyhydroxy polymer. For instance, polymers obtained by hydrogenating a copolymer of polyhydroxydiene in a known method, the product obtained by oxidation, decomposition and reduction of a copolymer of isobutylene-diene monomers and the product obtained by oxidation, decomposition and reduction of a copolymer of an $\alpha$-olefin (for instance, ethylene and propylene) and a non-conjugated diene (or conjugated diene) may be mentioned.

Of the above-mentioned materials, the product obtained by hydrogenating a polymer of polyhydroxydiene is particularly preferable.

Such a polymer of polyhydroxydiene is produced by a well known method, for instance, radical polymerization method, anionic polymerization method, etc. while using a conjugated diene or the conjugated diene and a vinyl monomer as the raw material. In the case of adopting the radical polymerization method, when the polymerization is carried out with hydrogen peroxide as the initiator, a polymer or copolymer of a diene having a hydroxy group at the chain end thereof is obtained. In the case of adopting the anionic polymerization method, living polymers having alkali metal atoms at the chain ends thereof are produced at first, while using a catalyst for anionic polymerization and then a mono-epoxy compound, formaldehyde, or the like is reacted with the thus obtained living polymers. As the conjugated diene used as the starting material, isobutylene, chloroprene, etc. may be used, however, 1,3-butadiene is preferable. As the copolymerization component, vinyl monomers such as styrene, acrylonitrile, methyl acrylate, methyl methacrylate, etc. may be mentioned. The amount of the copolymerization component used in the copolymerization is preferably less than 30% by weight of the total amount of the monomers.

The hydrogenation reaction for producing the hydrogenated product of the polymer of polyhydroxydiene may be carried out by an ordinary method under gaseous hydrogen in the presence of a catalyst such as nickel, cobalt, platinum, palladium, ruthenium, rhodium, etc., singly or one of these metals supported on a carrier.

As the hydrocarbon oil used in the present invention, a mineral oil such as a paraffinic process oil, a naphthenic process oil, an aromatic process oil, or the like, or a hydrocarbon oil such as an alkylbenzene, polybutene, diphenylethane, alkylnaphthalene, or the like. may be mentioned.

As the polyisocyanate which is used according to the present invention, hexamethylene diisocyanate, tolylene diisocyanate, diphenylmethane diisocyanate, dicyclohexylmethane diisocyanate, isophorone diisocyanate or a polymeric diphenylmethane diisocyanate may be mentioned. They may be used singly or in mixtures of mixing two or more isocyanates.

In order to prolong the pot-life of the polymer, it is preferable to prepolymerize the polyisocyanate with a portion of the polyhydroxy polymer of a saturated hydrocarbon.

The polyurethane compound (polyurethane resin) thus obtained according to the present invention has a high hydrophobicity, and is excellent in resistance to hydrolysis and in long term stability from the structure thereof.

The viscosity of each of the two components of the polyurethane resin according to the present invention is preferably in a range of 5,000 to 15,000 cps, preferably 5,000 to 12,000 cps, at 28° C. In the case of filling the material having a viscosity below 5,000 cps into the cable, it leaks through the joint of the pressure-resistant tube and satisfactory filling can not be carried out.

On the other hand, in the case where the viscosity of the components of the polyurethane resin is over 15,000, there is a problem of difficulty in moving the resin within the filling apparatus.

Furthermore, a submersible optical fiber cable has a large length as compared to the ordinary electric wire and cable, and the length thereof extends generally to several ten kilometers. Accordingly, it takes a continued operation of 50 to 100 hours to produce one unit length of the cable.

Accordingly, it is necessary that the pot-life (curing time) of the polyurethane resin to be filled into the cable is at least 5 hours. In the case where the pot-life is below 5 hours, the resin which adheres to the inner wall of the die, etc. cures during the operation, thus causing the problem of clogging.

The polyurethane resin of the present invention, after curing, shows a tensile breaking strength of higher than 0.30 kg/cm$^2$, preferably higher than 0.50 kg/cm$^2$, a breaking extension of larger than 200%, preferably larger than 250%, and a shearing peel strength from an aluminum plate (stipulated by Japanese Industrial Standards (JIS) K 6850) of higher than 0.01 kg/cm$^2$, preferably higher than 0.50 kg/cm$^2$. Although there are cases where the metallic pressure-resistant layer is made of a metal other than aluminum, the polyurethane resin which shows a satisfactory shearing peel strength from an aluminum plate also exhibits a sufficient effect on a metallic pressure-resistant layer made of a metal other than aluminum. In addition, it is desirable that the creep characteristic thereof (obtained by calculation after the stress-relaxation test, $\epsilon_t/\epsilon_0$) is less than 2.8, preferably less than 2.5, and more preferably less than 2.2 within the time of determination of 60 sec.

Furthermore, in consideration that the compression modulus of elasticity of the resin constructing the covering of the optical fiber unit is ordinarily from 60 to 80 kg/cm$^2$, it is desirable for the mechanical properties after producing the cable that the compression modulus of elasticity of the polyurethane resin is less than 80 kg/cm$^2$, preferably less than 60 kg/cm$^2$, and more preferably in the range of 2 to 50 kg/cm$^2$.

Since the submersible optical fiber cable according to the present invention has been constructed by filling the voids within the cable by a polyurethane resin having creep characteristics in an appropriate range after having recognized the mechanism of water-ingress from theoretical considerations and practical experiments, the resin filler effectively prevents water-ingress into the cable by hydraulic pressure at any time the cable is to less than a practically allowable extent, and a large practical profit is expected economically on the cable by improving confidence in the submersible fiber cable.

The present invention will be explained more in detail while referring to the non-limitative examples and experimental examples as follows.

EXAMPLE 1

Production of the two-liquid mixing-type polyurethane resin to be filled into the voids of the optical fiber submarine cable according to the present invention

(1) Production of the component (A)

After mixing 500 g of polyolefinpolyol (made by MITSUBISHI CHEMICAL INDUSTRIES Ltd. under the trade name of POLYTAIL ®HA, the number average molecular weight of 2,000 and the concentration of hydroxy groups of 0.902 meq/g) and 800 g of a paraffinic process oil (made by KYODO Petroleum Oil Co., Ltd., Grade P-200) at room temperature, 30 g of tolylene diisocyanate were added to the thus prepared mixture, and the whole mixture was heated to 80° C. and was reacted for 8 hours at the temperature. Thereafter, 11 g of ADEKAQUODROL ® (made by ASAHIDENKA Co., Ltd., an adduct of ethylenediamine/propylene oxide, tetrafunctional polyol of the concentration of hydroxy groups of 13.56 meq/g) were added to the reaction product and the thus obtained mixture was stirred until the mixture became uniform, thereby obtaining the component (A) showing the viscosity of 7,800 cps at 28° C.

(2) Production of the component (B)

After mixing 500 g of the same polyolefinpolyol as in (1) production of the component (A) and 600 g of the same process oil as in (1) production of the component (A) at room temperature, 59 g of tolylene diisocyanate were added to the mixture, and the whole mixture was heated to 80° C. and was reacted for 6 hours at the temperature thereby obtaining the component (B) showing a viscosity of 8,500 cps at 28° C.

(3) Production of the compounded, hardened material

After compounding the component (A) produced in (1) with the component (B) produced in (2) at a weight ratio of 1:1, the thus compounded material was left to stand for 2 weeks at room temperature, thereby obtaining the cured material, the mechanical properties thereof including the modulus of elasticity being measured and the results being shown in Table 1.

Separately, after compounding the two components (A) and (B) at a weight ratio of 1:1, 100 ppm of dibutyltin mercaptide were added as a catalyst to the compounded material, and the material was pumped into a metal mold and subjected to pressing for 1 hour at 100° C. to obtain a cured sheet.

EXAMPLE 2

Production of the two-liquid mixing-type polyurethane resin to be filled into the voids of the optical fiber submarine cable according to the present invention

(1) Production of the component (A)

After mixing 500 g of polyolefinpolyol (made by MITSUBISHI CHEMICAL INDUSTRIES Ltd. under the trade name of POLYTAIL ®HA, the number average molecular weight of 2,000 and the concentration of hydroxy groups of 0.893 meq/g) and 720 g of a paraffinic process oil (made by KYODO Petroleum Oil Co., Ltd., Grade P-200) at room temperature, 29 g of tolylene diisocyanate were added to the thus prepared mixture, and the whole mixture was heated to 80° C. and was reacted for 8 hours at the temperature. Thereafter, 40 g of ADEKAQUODROL ® (made by ASAHIDENKA Co., Ltd., an adduct of ethylene diamine/propylene oxide, tetrafunctional polyol of the concentration of hydroxy groups cf 13.6 meq/g) were added to the reaction product and the thus obtained mixture was stirred until the mixture became uniform, thereby obtaining the component (A) showing the viscosity of 7,400 cps at 28° C.

(2) Production of the component (B)

After mixing 500 g of the same polyolefinpolyol as in (1) production of the component (A) and 310 g of the same process oil as in (1) production of the component (A) at room temperature, 78 g of tolylene diisocyanate were added to the mixture, and the whole mixture was heated to 80° C. and was reacted for 4 hours at the temperature thereby obtaining the component (B) showing a viscosity of 6,800 cps at 28° C.

(3) Production of the compounded, hardened material

After compounding the component (A) produced in (1) with the component (B) produced in (2) at a weight ratio of 1:1, the compounded material was left to stand for 2 weeks at room temperature, thereby obtaining the cured material, the mechanical properties thereof including the modulus of elasticity being measured and the results being shown in Table 1.

Separately, after compounding the two components (A) and (B) at a weight ratio of 1:1, 100 ppm of dibutyltin mercaptide were added as a catalyst to the compounded material, and the material was pumped into a metal mold and subjected to pressing for 1 hour at 100° C. to obtain a cured sheet.

EXAMPLE 3

Production of the two-liquid mixing-type polyurethane resin to be filled into the voids of the optical fiber submarine cable according to the present invention

(1) Production of the component (A)

After mixing 500 g of polyolefinpolyol (made by MITSUBISHI CHEMICAL INDUSTRIES Ltd. under the trade name of POLYTAIL ®HA, the number average molecular weight of 2,000 and the concentration of hydroxy groups of 0.902 meq/g) and 300 g of a paraffinic process oil (made by KYODO Petroleum Oil Co., Ltd., Grade P-200) at room temperature, 15 g of polymeric diphenylmethane diisocyanate (made by KASEI-UPJOHN Co., Ltd. index of PAPI-135, of the concentration of NCO of 31.3% by weight) were added to the thus prepared mixture, and the whole mixture was reacted at 80° C. for 3 hours to obtain a prepolymer. After adding 6 g of ADEKAQUODROL ® to the thus obtained prepolymer, the mixture was stirred until the mixture became uniform, thereby obtaining the component (A) showing the viscosity of 13,000 cps at 28° C.

(2) Production of the component (B)

After mixing 500 g of the same polyolefinpolyol as in (1) production of the component (A) and 310 g of the same process oil as in (1) production of the component (B) at room temperature, 79 g of tolylene diisocyanate were added to the mixture, and the whole mixture was heated to 80° C. and was reacted for 6 hours at the temperature thereby obtaining the component (B) showing a viscosity of 8,500 cps at 28° C.

(3) Production of the compounded, hardened material

After compounding the component (A) produced in (1) with the component (B) produced in (2) at a weight ratio of 1:1, the compounded material was left to stand for 2 weeks at room temperature, thereby obtaining the cured material, the mechanical properties thereof including the modulus of elasticity being measured and the results being shown in Table 1.

Separately, after compounding the two components (A) and (B) at a weight ratio of 1:1, 100 ppm of dibutyltin mercaptide were added as a catalyst to the compounded material, and the material was pumped into a metal mold and subjected to pressing for 1 hour at 100° C. to obtain a cured sheet.

TABLE 1

| | Mechanical Properties of the Polyurethane Resin | | | | | | |
|---|---|---|---|---|---|---|---|
| | Initial compression modulus of elasticity (kg/cm$^2$) | Shearing peel strength to aluminum plate (kg/cm$^2$) | Tensile strength at | | | Tensile break strength (kg/cm$^2$) | Breaking extension (%) |
| | | | 100% elongation (kg/cm$^2$) | 200% elongation (kg/cm$^2$) | 300% elongation (kg/cm$^2$) | | |
| Example 1 | 10 | 2.5 | 0.17 | 0.27 | 0.40 | 1.58 | 590 |
| Example 2 | 42 | 3.0 | 2.25 | 4.55 | — | 8.00 | 280 |
| Example 3 | 26 | 3.0 | 0.37 | 0.54 | 0.77 | 2.08 | 520 |
| Example 4 | 6.3 | 3.0 | 0.10 | 0.13 | 0.17 | 0.68 | 640 |
| Comparative Ex. 1 | 8 | 1.5 | — | — | 0.10 | 0.30 | 700 |
| Comparative Ex. 2 | 65 | 3.0 | 3.8 | 9.5 | — | 10.0 | 210 |

EXAMPLE 4

Production of the two-liquid mixing-type polyurethane resin to be filled into the voids of the optical fiber submarine cable according to the present invention (1) Production of the component (A)

By uniformly mixing 500 g of the same polyolefin-polyol as in Example 1, 220 g of polyolefin (made by MITSUBISHI CHEMICAL INDUSTRIES Ltd. of a number average molecular weight of 2,000, under the trade name of POLYTAIL ®HAB) and 320 g of the same paraffinic process oil as in Example 1, a component (A) (a liquid) was obtained, the viscosity of the component (A) being 6,100 cps at 28° C.

(2) Production of the component (B)

After mixing 500 g of the same polyolefinpolyol as in Example 1, 110 g of the same process oil as in Example 1, and 78 g of tolylene diisocyanate, the mixture was reacted at 130° C. for 5 hours to obtain a prepolymer.

After adding 390 g of the same paraffinic process oil as in Example 1 and 25 g of a modified diphenylmethane diisocyanate (made by KASEI-UPJOHN Co., Ltd., under the trade name of ISONATE 143 L of a concentration of NCO of 29.0% by weight) to the thus obtained prepolymer, the mixture was stirred until the mixture became uniform, thereby obtaining the component (B) of a viscosity of 6,200 cps at 28° C.

(3) Production of the compounded, hardened material

After compounding the component (A) produced in (1) with the component (B) produced in (2) at a weight ratio of 1:1, the compound material was left to stand for 2 weeks at room temperature, thereby obtaining the cured material, the mechanical properties thereof including the modulus of elasticity being measured and the results being shown in Table 1.

Separately, after compounding the two components (A) and (B) at a weight ratio of 1:1, 100 ppm of dibutyltin mercaptide were added as a catalyst to the compounded material, and the material was pumped into a metal mold and subjected to pressing for 1 hour at 100° C. to obtain a cured sheet.

The data of tensile break strength and breaking extension shown in Table 1 were obtained by testing the dumbbell-shaped specimen prepared by punching in accordance with Japanese Industrial Standards (JIS) K 6301, No. 3 a sheet produced by the steps of (1) pumping each of the polyurethane resins prepared in Examples 1 to 4 into a spacer of a spun of 2 mm inserted between a teflon sheet and a ferro type plate, (2) introducing the thus prepared set into a press heated to 100° C., and after repeatedly applying and releasing the pressure, thereby effecting de-bubbling, applying a pressure of 100 kg/cm$^2$ at the temperature, thereby curing the resin, and (3) taking the resin sheet out from the spacer.

The tensile elongation was measured following Japanese Industrial Standards K 6301. In the tensile test, the tensile speed was 200 mm/min.

Figure 3:
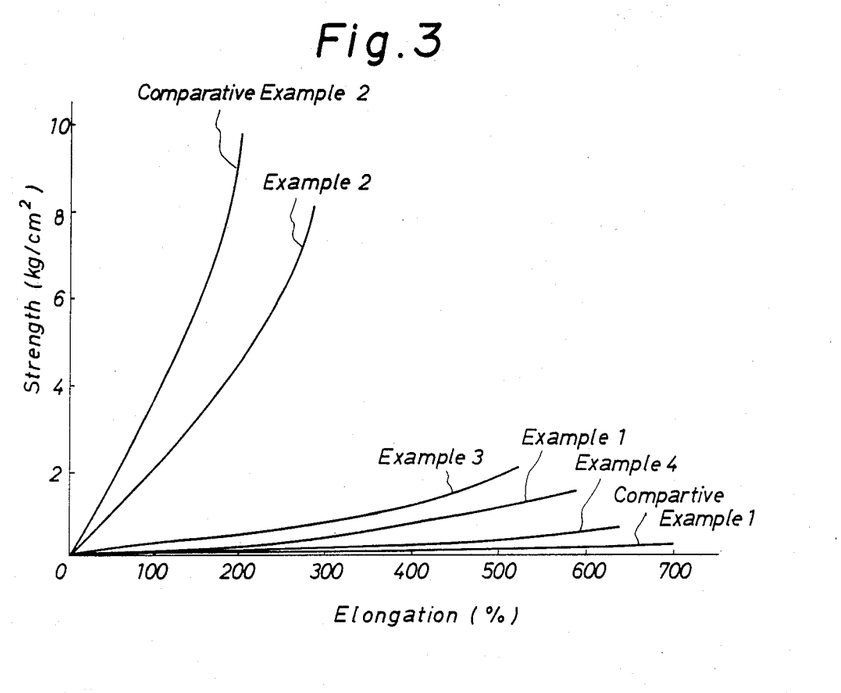
FIG. 3 is the graph of the tensile strength of the specimens produced in Examples.

The data of tensile strength are also shown in FIG. 3.

The following is the explanation of the method for obtaining "calculated creep characteristics ($\epsilon_t/\epsilon_0$)" from the stress-relaxation data of each specimen, wherein $\epsilon_t$ is the creep strain after the time t and $\epsilon_0$ is the initial strain at the test.

(1) After placing a small amount (about 50 g) of the specimen of the polyurethane resin on the sample table of a rheometer (made by FUDOH KOHGYO Co., Ltd.), a cylindrical adaptor of 5 mm in diameter is penetrated into the specimen to a depth corresponding to 9.5% of the thickness of the specimen, and the adaptor was stopped. The strain on the adaptor ($\sigma_t$) at the above-mentioned state is measured.

The stress-relaxation modulus of elasticity (relaxation modulus of elasticity), $E_{r(t)}$, is known to follow the formula (I) in the case where the situation is approximated by Maxwell model.

$$E_{r(t)} = \frac{\sigma_t}{\epsilon} = \frac{\sigma_0}{\epsilon} e^{-t/\tau} \tag{I}$$

wherein $E_{r(t)}$ is the relaxation modulus of elasticity at time t,
$\sigma_t$ is the stress on the adaptor at time t, and
$\epsilon$ is the strain of 9.5% (=0.095).

Figure 4:
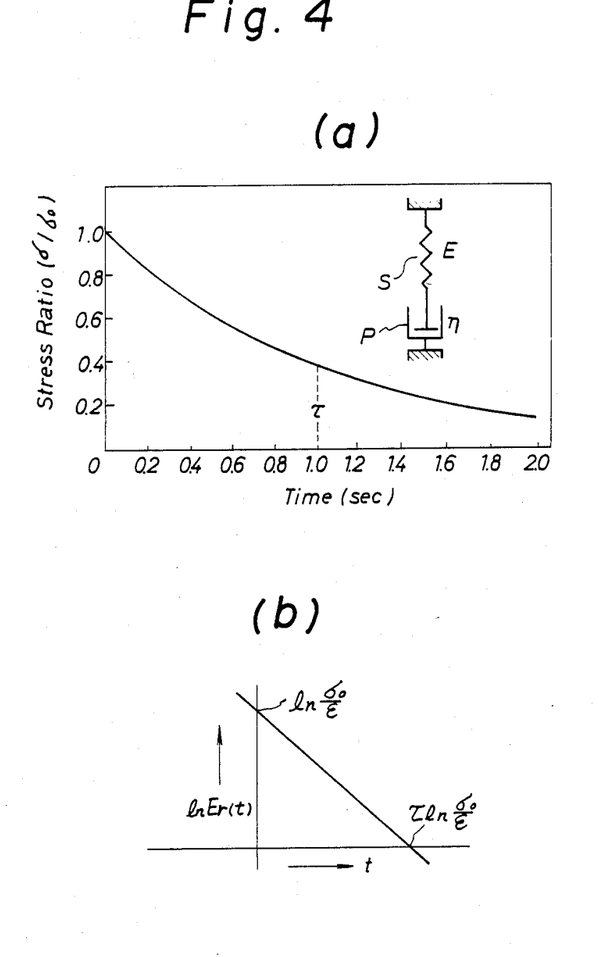

FIG. 4 shows a Maxwell model and the relationship between the time and the stress ratio, wherein E is the modulus of elasticity of the spring S, $\eta$ is the viscosity in the dashpot P and $\tau = \eta/E$ is referred to as the relaxation time $\tau$.

Accordingly, the easiness of relaxation can be represented by the level of $\tau$, for instance, in the case where τ is larger, the change of $E_{r(t)}$ with the time is smaller, namely, the specimen is difficultly relaxed.

(2) The relaxation time τ is represented by the formula (I), and in the case where the natural logarithm of the both sides of the formula (I) are taken, the following formula is obtained.

$$\ln E_{r(t)} = \ln \frac{\sigma_0}{\epsilon} - \frac{t}{\tau} \quad \text{(II)}$$

Accordingly, in the case of drawing a graph while taking the time in abscissa and taking $\ln E_{r(t)}$ in ordinate, a linear line as shown in FIG. 4(b) is obtained wherein $\ln E_{r(0)} = \ln(\sigma_0/\epsilon)$ at $t=0$ and $t=\tau \ln(\sigma_0/\epsilon)$ at $\ln E_{r(t)} = 0$.

Since the inclination of the linear line is $-(1/\tau)$, the relaxation time τ can be obtained therefrom.

The data, namely the level of τ, obtained by the test on the specimens produced in Examples 1 to 4 are as follows.

| Level of τ (sec) | Example No. |
|---|---|
| 180 | 1 |
| 467 | 2 |
| 189 | 3 |
| 105 | 4 |
| 73 | Comparative Example 1 |
| 1060 | Comparative Example 2 |

(3) The method for obtaining the creep characteristics ($\epsilon_t/\epsilon_0$)

In the case of obtaining the creep characteristics from the results of the above-mentioned stress-relaxation test, the following formula (III) is approximated in the approximation of the creep characteristics following the Maxwell model.

$$(\epsilon_t/\epsilon_0)_{creep} = (\sigma_0/\sigma_t)_{relax} \quad \text{(III)}$$

wherein
$\epsilon_0$ is the initial strain in the creep test,
$\epsilon_t$ is the creep strain after the time t,
$\sigma_0$ is the initial stress in the stress-relaxation test,
$\sigma_t$ is the stress after the time t.

The determination of the relaxation modulus of elasticity and the approximating calculation to the level of creep were carried out while following the description of L. E. Nielsen "Mechanical Properties of Polymers and Composites".

Figure 5:
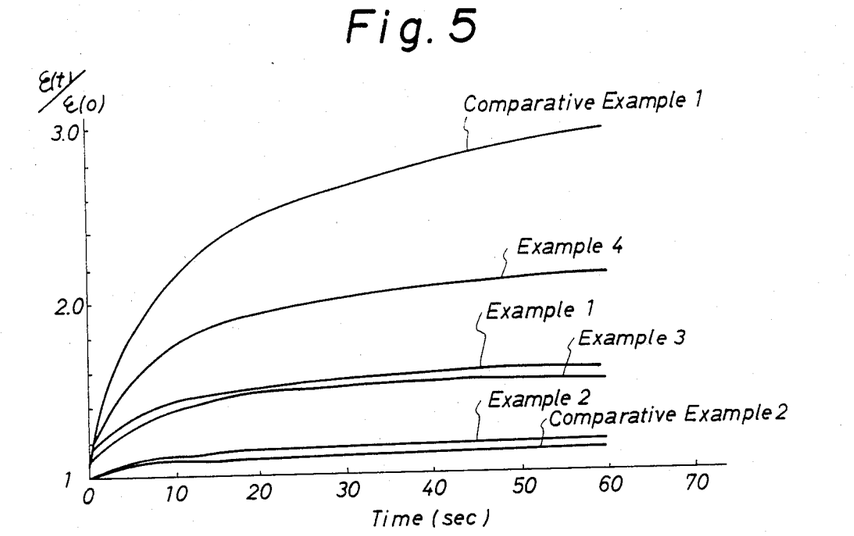
FIG. 5 is the graph of the creep characteristics of the specimens produced in Examples.

Since the relaxation time, τ, can be obtained from a formula $\sigma_t = \sigma_0 \cdot e^{-t/\tau}$ derived from the formula (I), the relationship between the time t and $\epsilon_t/\epsilon_0$, namely, the creep characteristics of each of the specimens produced in Examples 1 to 5 can be shown as a graph, and FIG. 5 shows each of the graphs representing respectively the creep characteristics of the specimens by the above-mentioned techniques.

The following Experimental Examples show the production of the optical fiber submarine cables according to the present invention and the results of the experimental tests carried out thereon.

EXPERIMENTAL EXAMPLE 1

Figure 6:
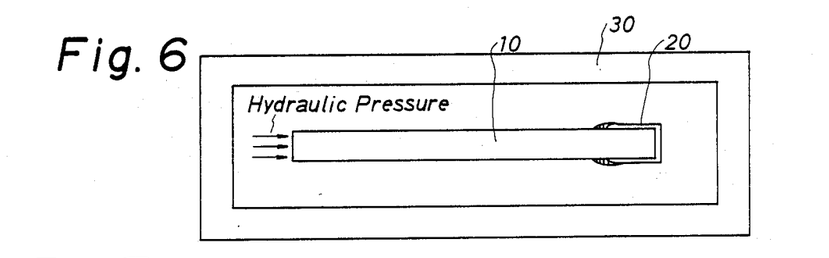
FIGS. 6 and 7 are the schematic views of the device for the experiment of water-ingress.
Figure 7:
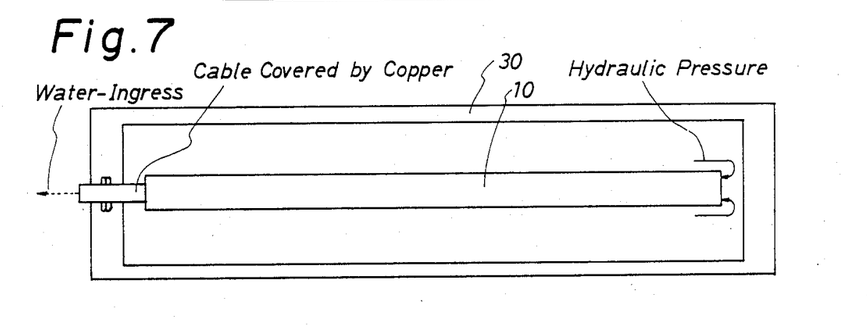

After producing each of the optical fiber submarine cables (10 in FIG. 6) by filling each of the polyurethane resins produced in Examples 1 to 4 and the other materials shown in Comparative Examples 1 and 2 into each of the optical fiber submarine cables of 10 m in length, closing one of the ends thereof with a cap 20 made of the same metal in the cable and introducing the cable into a hydraulic pressured tube 30, a hydraulic pressure of 20 atm. was applied from the other end of the cable. After applying the pressure for a predetermined period of time (40 minutes), the specimen (cable) was taken out from the hydraulic pressure tube and disjointed the specimen into pieces to examine the length of water-ingress. As the results of examination, it was found that (1) the specimen produced by filling the other material different from those according to the present invention showed the water-ingress to the metal cap 20, namely, the length of water-ingress of 10 meters, however, (2) in the specimens produced by filling the polyurethane resin according to the present invention, the length of the water-ingress was below 10 m as are seen in Table 2.

TABLE 2

| | Length of water-ingress |
|---|---|
| Example 1 | about 5.5 m |
| Example 2 | about 9.3 m |
| Example 3 | about 5.2 m |
| Example 4 | about 7.0 m |
| Comparative Ex. 1 | 10 m to the metal cap |
| Comparative Ex. 2 | the same as above |

EXPERIMENTAL EXAMPLE 2

In a similar manner to the manner in Experimental Example 1 except for using each of the optical fiber submarine cables of a length of 100 m instead of 10 m in Experimental Example 1, hydraulic test was carried out by applying a hydraulic pressure of about 550 atm. from one of the free ends of the cable until the water-ingress was recognized at the other end of the cable while measuring the time period from the beginning of pressure application to the recognition of water-ingress at the end.

As the result, it was found that the time period in the specimens to which each of the polyurethane resins according to the present invention (produced in Examples 1, 2 and 4) was filled was longer than 17 hours (Example 1), about 3 hours (Example 2) and about 4 hours (Example 4).

By the way, a specification in preventing the water-ingress in the optical fiber submarine cable is internationally stipulated to as 3.5 hours in the above-mentioned test method, and in consideration of the above-mentioned results, the optical fiber submarine cable in which the resins produced respectively in Examples 1, 2 and 4 were filled have the sufficient perfomance for preventing water-ingress, and from the results of Experimental Example 1, also the resin produced in Example 3 may be assumed to have a sufficient performance for that purpose.

In addition, concerning the materials of Comparative Examples 1 and 2, they are evaluated to be unsuitable for preventing the water-ingress in the consideration of even only the result of Experimental Example 1 and the result of the resin of Example 2 in Experimental Example 2.

What is claimed is:

1. A submersible optical fiber cable produced by filling the voids surrounding the optical fibers and the surrounding tension members of the cable with a two-liquid mixing and curing polyurethane resin which has a tensile breaking strength of higher than 0.30 kg/cm$^2$, a breaking extension of larger than 200%, creep characteristics ($\epsilon_t/\epsilon_0$) obtained by calculation in the stress-relaxation test of less 2.8 within 60 second of the determination time and a compression modulus of elasticity of less than 80 kg/cm$^2$.

2. The submersible optical fiber of claim 1, wherein said tensile breaking strength is higher than 0.50 kg/cm$^2$ and said breaking extension is larger than 250%.

3. The submersible optical fiber of claim 1, wherein said polyurethane resin exhibits a shearing peel strength greater than 0.01 kg/cm$^2$ as demonstrated by the adhesive strength between said polyurethane resin and an aluminum plate.

4. The submersible optical fiber of claim 1 or 3, wherein the viscosity of each of the two components of said polyurethane resin ranges from 5,000 to 15,000 cps at 28° C.

5. The submersible optical fiber of claim 4, wherein said viscosity ranges from 5,000 to 12,000 at 28° C.

6. The submersible optical fiber cable of claim 1, wherein the components of said polyurethane resin comprise a polyhydroxy saturated hydrocarbon polymer, a polyisocyanate and a hydrocarbon oil.

7. The submersible optical fiber cable of claim 6, wherein said polyhydroxy saturated hydrocarbon polymer has a number average molecular weight of 500 to 20,000 and the mean number of hydroxy groups is larger than the 1.5 per molecule thereof, said polymer not substantially containing any unsaturated bonds.

* * * * *